(12) United States Patent
Murata

(10) Patent No.: US 6,568,869 B1
(45) Date of Patent: May 27, 2003

(54) THREE DIMENSIONAL UNIVERSAL UNIT FOR MOVABLE STRUCTURE

(75) Inventor: Satoshi Murata, Tsukuba (JP)

(73) Assignees: Agency of Industrial Science & Technology, Tokyo (JP); Ministry of International Trade & Industry, Tokyo (JP)

( * ) Notice: Subject to any disclaimer, the term of this patent is extended or adjusted under 35 U.S.C. 154(b) by 135 days.

(21) Appl. No.: 09/708,532

(22) Filed: Nov. 9, 2000

(30) Foreign Application Priority Data

Nov. 9, 1999 (JP) .............................. 11-318644

(51) Int. Cl.[7] .............................. F16B 7/10; F16C 11/00; F16D 1/12
(52) U.S. Cl. ........................................ 403/52; 446/129
(58) Field of Search ............................ 403/3, 4, 24, 52, 403/53, 410; 901/14–16, 19, 23, 27–30, 38, 50; 446/129, 132–136, 137, 138

(56) References Cited

U.S. PATENT DOCUMENTS

| | | | | |
|---|---|---|---|---|
| 4,109,398 A | * | 8/1978 | Hida ............................. | 35/13 |
| 4,457,738 A | * | 7/1984 | Gross et al. ................. | 464/115 |
| 4,964,062 A | * | 10/1990 | Ubahayakar et al. ....... | 364/513 |
| 5,592,877 A | * | 1/1997 | Szyszko et al. ............. | 101/129 |
| 5,788,618 A | * | 8/1998 | Joutras ........................ | 482/114 |
| 5,988,845 A | | 11/1999 | Murata ........................ | 364/131 |
| 6,145,416 A | * | 11/2000 | Bonniot ................... | 81/177.75 |
| 6,308,521 B1 | * | 10/2001 | Eylman ........................ | 62/93 |

FOREIGN PATENT DOCUMENTS

| | | |
|---|---|---|
| JP | 8-001575 | 1/1996 |
| JP | 10-110893 | 4/1998 |

* cited by examiner

*Primary Examiner*—Christopher J. Novosad

(57) ABSTRACT

A three-dimensional universal unit for movable structures includes first and second coupling members. Each coupling member includes two opposing side surface parts, an end face part connected to form a right angle with one end face of each side surface part, a coupling/uncoupling device provided on the two side surface parts and end surface part of the first coupling member and operating independently, a permanent magnet provided on the two side surface parts and end face part of the second coupling member, and a linking part disposed between the two side surface parts of each coupling member. The universal unit further includes a linking member that rotatably links the linking parts of the two coupling members and a drive apparatus that rotationally drives the two coupling members relative to the linking member.

5 Claims, 11 Drawing Sheets

FIG.15
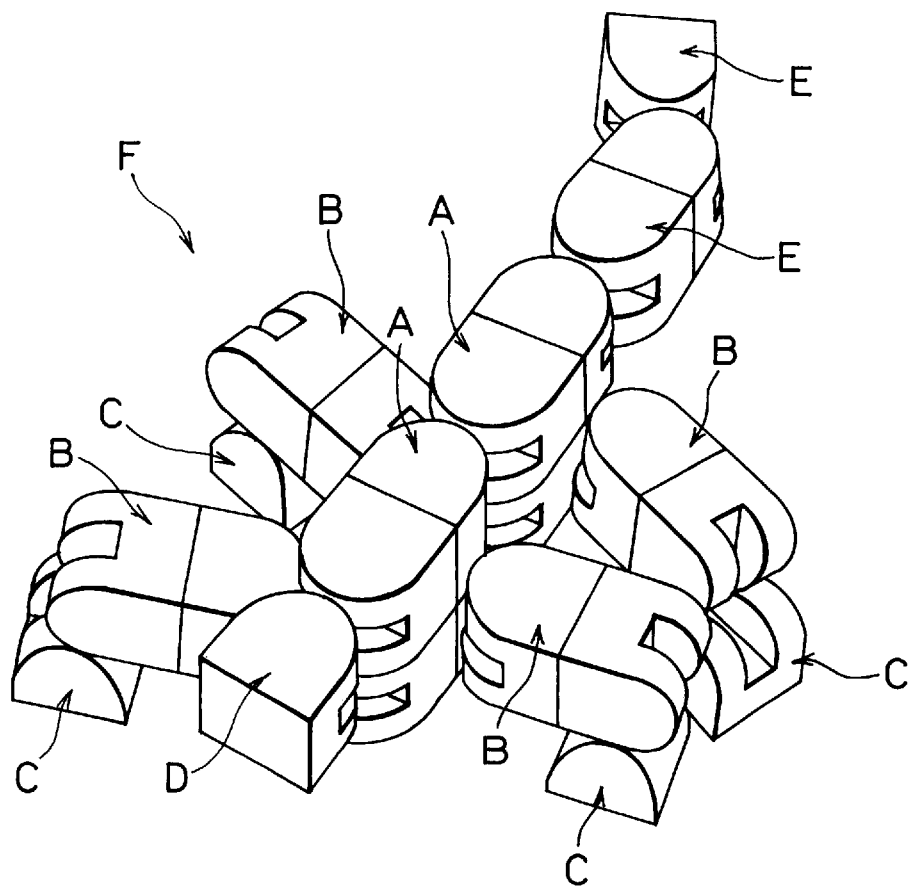
FIG.16(d) FIG.16(b)
FIG.16(c) FIG.16(a)
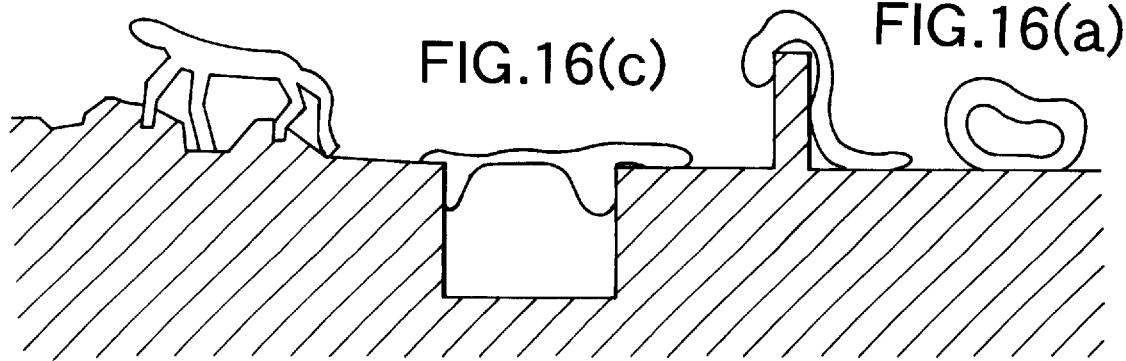

THREE DIMENSIONAL UNIVERSAL UNIT FOR MOVABLE STRUCTURE

BACKGROUND OF THE INVENTION

1. Field of the Invention

This invention relates to a universal unit that can form three-dimensional structures of arbitrary shape by means of automatic self-configuration, and more concretely to a three-dimensional universal unit for movable structures that is suited to utilization in three-dimensional structures of arbitrary shape to be erected in outer space or other extreme environments, consisting of a plurality of universal units of identical structure which are coupled to each other and these couplings can be changed, released or recoupled without outside assistance, thereby forming the desired three-dimensional structure by itself.

2. Description of the Prior Art

When various types of work are necessary in extreme environments such as outer space, planetary exploration, deep sea or inside nuclear reactors where work by humans is difficult or undesirable, this work must be performed using robots. It has been envisioned that such robots would form various structures by coupling together a plurality of assembly units of identical structure, or by changing, releasing or recoupling the couplings among the assembly units. Such robots would typically couple, release, change or recouple the units with outside assistance. However, if such structures are in the aforementioned extreme environments or confined spaces or the like where outside assistance is difficult to obtain, it is difficult to couple, release, change or recouple the units. Regarding this technical topic, the present inventors have already developed a multi-function module used to constitute equipment (JP-B-8-1575).

The structures formed by means of these multi-function modules used to constitute equipment have a two-dimensional shape, and the modules, each equipped with an information processing unit, can be coupled to each other by electromagnetic force and the positions of the couplings can be changed or repulsive force can be generated to release the couplings, so by successively changing the relationship among couplings with the adjacent modules, it is possible to change the two-dimensional shape of the entire structure. Therefore, starting from an initial shape when coupled into an arbitrary two-dimensional shape, it is possible to change the relationship among couplings to make it into a structure having the target two-dimensional shape. This apparatus is constituted such that an upper-layer member, middle-layer member and lower-layer member with a plurality of central axisymmetric protruding arms at equal intervals are coaxially stacked, where the upper-layer member and lower-layer member are in the same phase around the central axis, while the middle-layer member is in the opposite phase. In addition, the protruding arms of the upper-layer member and lower-layer member are coupled at a distance at which the protruding arms of the middle-layer member of another module can be inserted between them, and an attracting or repelling coupling/uncoupling mechanism is provided between the protruding arms of opposing upper-layer members and lower-layer members and the protruding arms of middle-layer members of other modules, while an information processing apparatus is connected to each protruding arm and transmitters and receivers are provided in order to perform communication with other modules that are coupled by means of the coupling/uncoupling mechanism. However, if the shape is changed in only two dimensions, its applications are markedly limited, since a three-dimensionally arbitrary shape is required for a general structure.

In order to meet these needs, the present inventors have further developed a three-dimensional universal unit proposed in U.S. Pat. No. 5,988,845 and JP-A-10-110893.

With the aforementioned three-dimensional universal unit proposed by the present inventors, the modules used to constitute equipment which can be formed into an arbitrary two-dimensional shape without outside assistance as proposed above have evolved to a constitution such that they can be assembled into an arbitrary three-dimensional shape, so a plurality of universal units of identical structure can be coupled or these couplings can be released or changed, and thus the desired three-dimensional structure can be self-configured.

However, the aforementioned proposal describes constructing a structure at limited lattice points, and it is difficult to construct machines that have active components such as robot arms, hands or walking machines. In addition, the modules have a complex structure, making them very difficult to manufacture and expensive, there are many areas of mechanical friction and the number of components is large so the probability of failure becomes higher, among other problems.

The present invention was accomplished in consideration of the above problems and one object thereof is to provide a three-dimensional universal unit for movable structures that has a simple structure and can easily form machines having active components, that operates reliably in long-term usage and that can be manufactured inexpensively.

SUMMARY OF THE INVENTION

In order to achieve the aforementioned object, the three-dimensional universal unit for movable structures according to this invention comprises first and second coupling members, each of which comprises two opposing side surface parts, an end face part connected to form a right angle with one end face of each side surface part, a coupling/uncoupling device provided on the two side surface parts and end face part of the first coupling member and which operates independently, a permanent magnet provided on the two side surface parts and end face part of the second coupling member, and a linking part disposed between the two side surface parts of each coupling member; a linking member that rotatably links the linking parts of the two coupling members; and a drive apparatus that rotationally drives the coupling members relative to the linking member.

The coupling/uncoupling device comprises a top plate, a base plate disposed movably opposite to said top plate, a permanent magnet secured upon the base plate, a compression coil spring disposed between the base plate and the top plate that continuously pushes the two apart, and a shape memory spring disposed between the base plate and the top plate, wherein the shape memory spring takes two positions: a short first shape that does not contact one of the base plate and the top plate when the base plate is separated furthest from the top plate; and a long second shape that pushes in a direction separating the base plate and top plate when the base plate is closest to the top plate.

The compression coil spring may comprise a conical coil spring adapted to the attraction characteristics of the permanent magnet.

The drive apparatus that rotationally drives the coupling members may be provided on the side of the linking member.

Electrodes that are secured in the interior of the coupling members and that extend to the surface of the top plate may be provided.

As described above, the universal unit according to the present invention consists of two coupling members of a simple structure that are easily configured and a linking member that links the two coupling members. Accordingly, it can operate reliably in long-term usage and can be manufactured inexpensively.

The above and other objects and features of the invention will become apparent from the following description made with reference to the appended drawings.

BRIEF EXPLANATION OF THE DRAWINGS

FIG. 6(a) is a top view of the top plate.

FIG. 15 is a perspective diagram showing an example of forming a four-legged moving structure using a plurality of universal units according to the present invention.

FIGS. 16(a), 16(b), 16(c) and 16(d) are explanatory diagrams showing a structure formed using a plurality of universal units according to the present invention which deforms while moving.

DESCRIPTION OF THE PREFERRED EMBODIMENTS

Figure 3A:
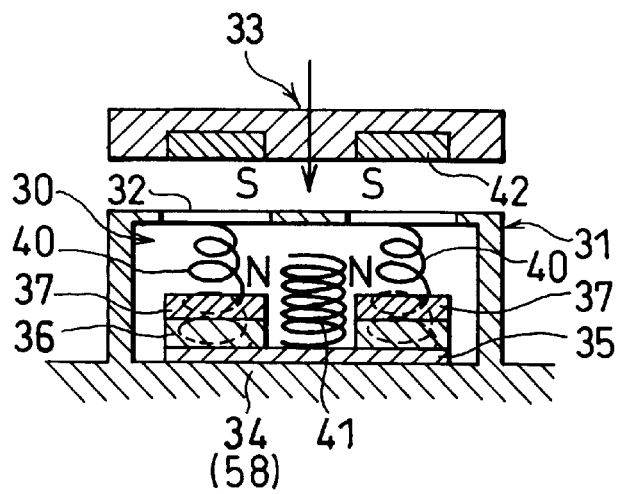
FIG. 3(a) is a cross section showing the first member and second member of the coupling/uncoupling device of the present invention in the separated state.

Before explaining the three-dimensional universal unit for movable structures according to the present invention, we shall first explain the principle of the universal unit coupling apparatus used in the three-dimensional universal unit for movable structures according to the present invention based on the schematic diagram of operation shown in FIG. 3. FIG. 3(a) shows the state wherein the second member 33 is positioned at a position separated from the top plate 32 of the first member 31 which is provided with an internal coupling/uncoupling device 30. The coupling/uncoupling device 30 consists of a frame 34 upon which is movably placed a base plate 35, upon which is secured via interposition members 36 the first permanent magnets 37, one pair of which is shown in the figure, and a conical coil spring 40 disposed behind the first permanent magnets 37 in the figure, while a cylindrical shape memory alloy spring 41 is disposed in the center and connected to an electric circuit in such manner that it can be electrified. In this state, the conical coil spring 40 is compressed with its lower end in contact with the base plate 35 and its upper end in contact with the inside surface of the top plate 32, and thus the base plate 35 is pushed downward in the figure. In addition, the shape memory alloy spring 41 is not electrified and it is in a first state wherein its length is short.

Figure 4A:
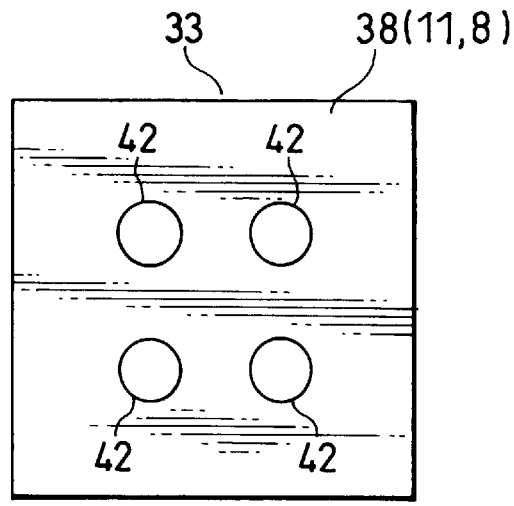
FIG. 4(a) is a top view of the second member shown in FIG. 3.
Figure 4B:
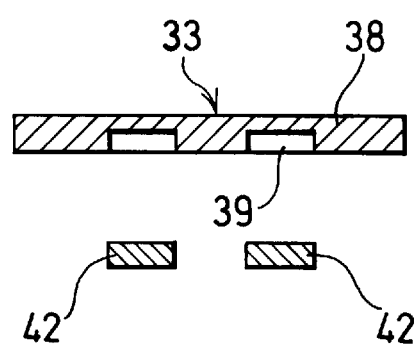
FIG. 4(b) is a cross section in the state wherein the permanent magnets of the second member are removed.

As shown in FIG. 4, the second member 33 has a constitution wherein the second permanent magnets 42 are fitted and secured in hollows 39 formed on the bottom surface of the base plate 38. The second permanent magnets 42 are disposed opposite the first permanent magnets 37. The first permanent magnets 37 and second permanent magnets 42 are disposed such that they have different polarities at the surface where they face each other. When all the first permanent magnets 37 have N polarity, all the second permanent magnets 42 have S polarity, and vice versa.

For example, if the N poles of the first permanent magnets 37 are toward the top as shown in FIG. 3(a), then the second permanent magnets 42 are disposed such that their S poles are toward the bottom. At this time, the attractive force between the two magnets is set such that, when the second member 33 is placed upon the top plate 32 of the first member 31 as shown in FIG. 3(b) for example, the attractive force between the two magnets is greater than the force by which the conical coil spring 40 presses the base plate 35 downward.

Thereby, when the second member 33 is separated from the first member 31 as shown in FIG. 3(a), the base plate 35, interposition members 36 and first permanent magnets 37 are positioned as a unit at the bottom. From this state, if the second member 33 approaches the top of the top plate 32 of the first member 31 as shown in FIG. 3(b), the attractive force between the two magnets becomes greater than the repulsive force of the conical coil spring 40, so the first permanent magnets 37 rise as a unit together with the base plate 35 and the conical coil spring 40 is compressed. At this time, the shape memory alloy spring 41 in the center is compressed, but the resilient force of the shape memory alloy spring 41 is weak when not electrified, so it is in the short first state wherein it can be easily compressed. Thus, the first member 31 and second member 33 can be coupled tightly. In this state, the first permanent magnets 37 pass through the holes in the top plate and come in direct contact with the second permanent magnets 42, so the two are coupled tightly.

Figure 3B:
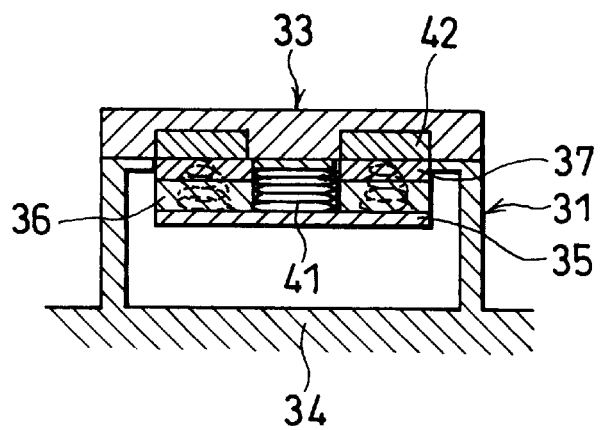
FIG. 3(b) is a cross section showing the first member and second member in the coupled state.
Figure 3C:
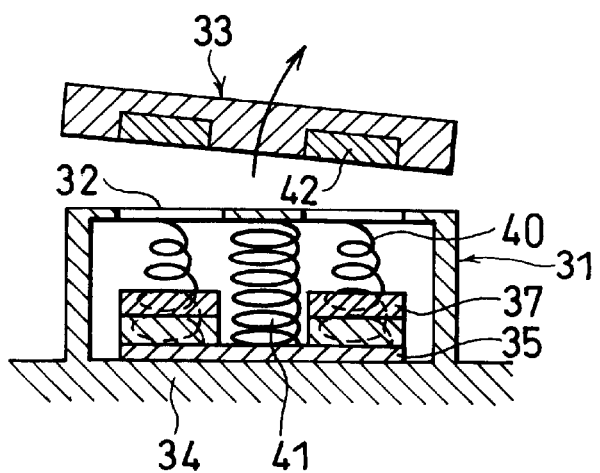
FIG. 3(c) is a cross section showing the first member and second member being uncoupled by the repulsive force of the coil spring.

Since the shape memory alloy spring 41 is manufactured such that upon being electrified it takes a second state wherein its length is long when preheated, the shape memory alloy spring returns from the state in which the two members are coupled as shown in FIG. 3(b) to the second state with a large force when heated due to electrification. For this reason, it lengthens as shown in FIG. 3(c), and the base plate 35 is pushed downward with a large force and if this force overcomes the repulsive force of the conical coil spring and becomes greater than the attractive force between the two attracting magnets, as shown in FIG, 3(c), the first permanent magnets 37 are separated from the side of the second permanent magnets 42, so the base plate 35 returns to its original state shown in FIG. 3(a). Since the attractive force among the two permanent magnets is effectively gone, the second member 33 can be freely separated from the first member 31 as shown in FIG. 3(c).

Figure 5:
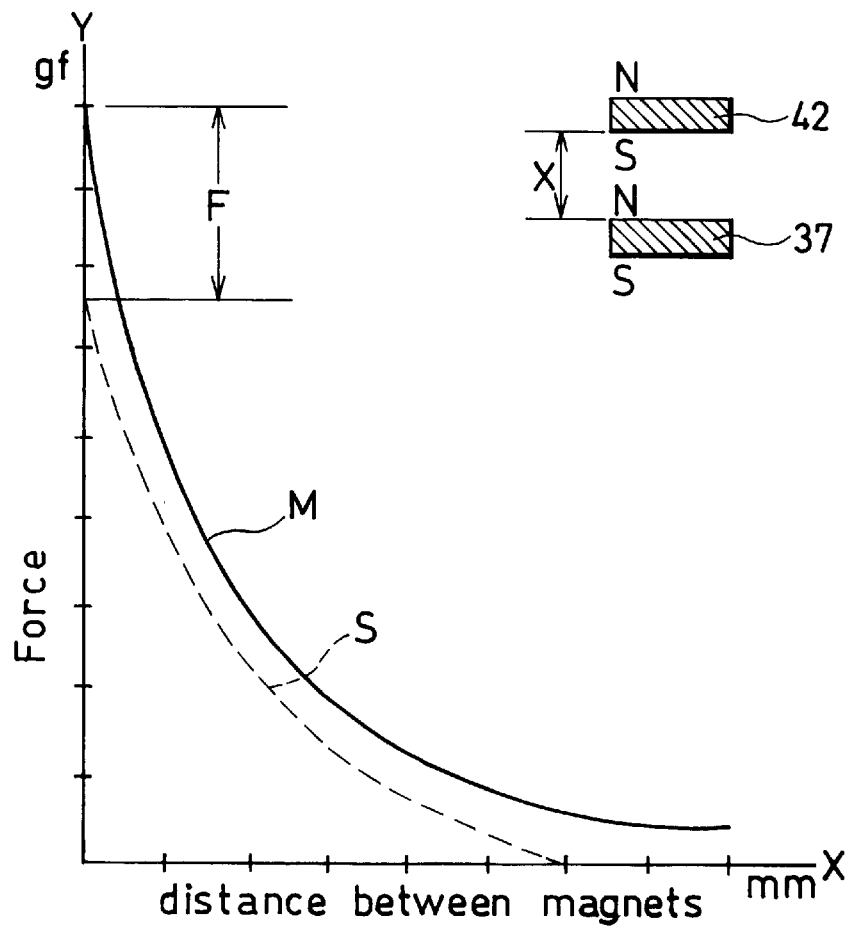
FIG. 5 is a graph of the attractive force of the permanent magnet and the repulsive force of the conical coil spring shown in FIG. 3.

In order to perform the aforementioned operation, the relationship among the attractive force between the first permanent magnets 37 and the second permanent magnets 42, the spring force of the conical coil spring 40 and the spring force of the shape memory alloy spring 41 may have the characteristic shown in FIG. 5 as an example. Note that the idea of storing the magnetic potential of a permanent magnet in a nonlinear spring has already been proposed by Shigeo Hirose, et al. (Advanced Robotics, Vol. 3, No. 1, pp. 225–242) and this technique can be used. In the graph shown in FIG. 5, the X-axis shows the distance between the first permanent magnets 37 and the second permanent magnets 42, while the Y-axis shows the attractive force between the two magnets and the spring force of the conical coil spring. The attractive force between the two permanent magnets exhibits the characteristic shown by the solid line M in the figure, while the spring force of the conical coil spring 40 is set to a value slightly lower than this attractive force and exhibiting the characteristic S similar to the characteristic M of the attractive force. With these characteristics, when electrification of the shape memory alloy induces a force greater than the difference between the attractive force between the two permanent magnets when the two magnets are in contact and the repulsive force in this state, the attractive force between the two magnets is overcome so the first member 31 and second member 33 can be separated with virtually no restraining force.

The coupling/uncoupling device 30 provided on the first member 31 of the three-dimensional universal unit for movable structures according to the present invention operates in accordance with the aforementioned principle, and may consist of the components shown in FIG. 6 as a specific example. To wit, overall it consists of the side surface part 10 or end face part 7 shown in FIGS. 6(a) and 6(b), the four conical coil springs 40 and a shape memory alloy spring 41 positioned at their center shown in FIGS. 6(c) and 6(d), the attractive member 53 shown in FIGS. 6(e) and 6(f) and the body member 54 shown in FIGS. 6(g) and 6(h).

The attractive member 53 consists of a base plate 35, interposition members 36 secured by adhesive or the like at the four corners and permanent magnets 37 secured by adhesive or the like upon these interposition members 36. In addition, the body member 54 consists of a lower frame 58, the four peripheral supports 61 shown in the figure disposed near the edge of the lower frame 58 and secured by screws 60, a central support 63 in the center and secured by a screw 62, and in the working example shown in the figure, four rods 64 that support the conical coil springs 40 in the figure that protrude from and are secured to the lower frame 58 among the aforementioned peripheral supports 61 and central support 63.

Figure 6A:
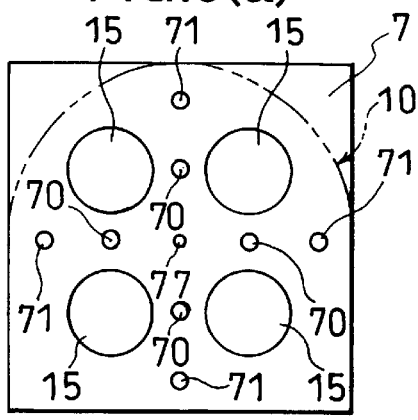
FIG. 6(a) is an exploded view of the coupling member used in the present invention, where
Figure 6B:
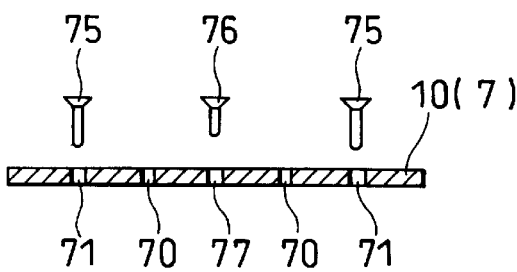
FIG. 6(b) is a cross section of the top plate of FIG. 6(a).
Figure 6C:
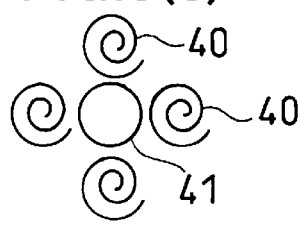
FIG. 6(c) is a top layout view of the conical coil spring and shape memory alloy spring.
Figure 6D:
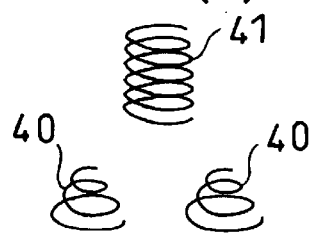
FIG. 6(d) is a side view of the coil spring and alloy spring of FIG. 6(c).
Figure 6E:
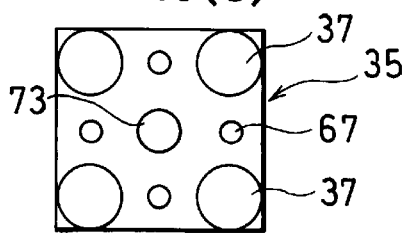
FIG. 6(e) is a top view of the base plate.
Figure 6F:
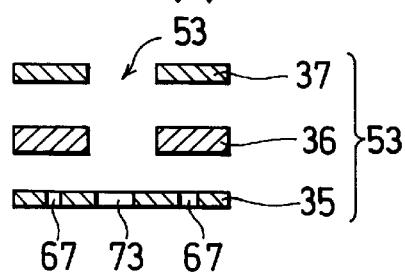
FIG. 6(f) is an exploded cross section of the base plate of FIG. 6(e).
Figure 6G:
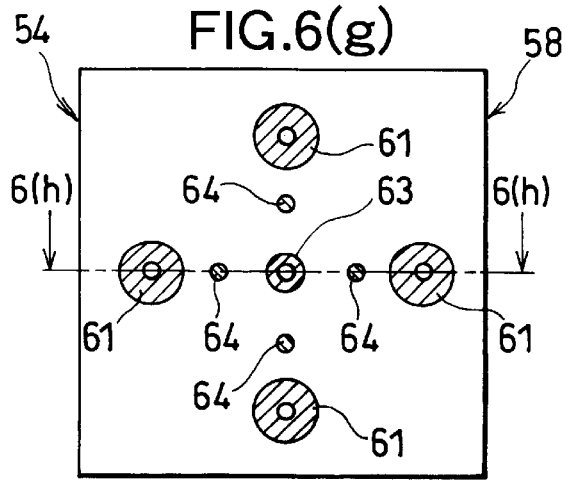
FIG. 6(g) is a top view of the body member with a portion shown in cross section.
Figure 6H:
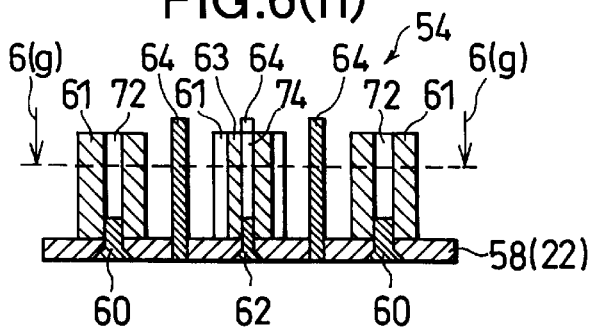
FIG. 6(h) is a cross section of the body member of FIG. 6(g).
Figure 7A:
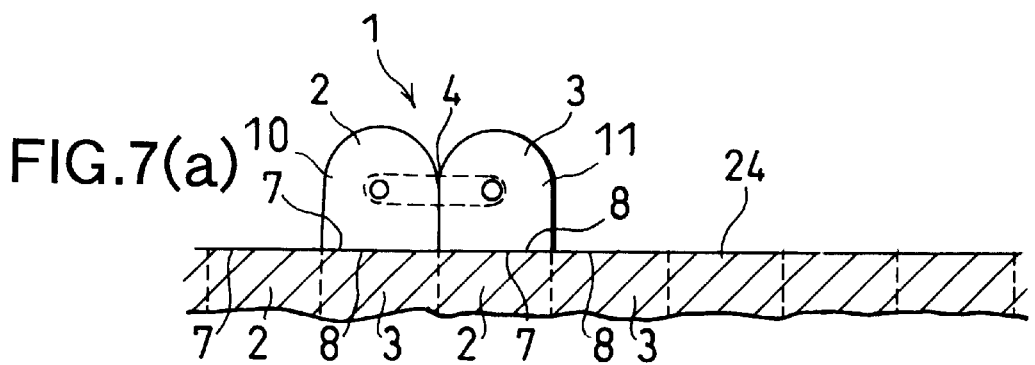
FIGS. 7(a), 7(b), 7(c) and 7(d) are diagrams used to explain the straight-line motion of the universal unit according to the present invention.
Figure 7B:
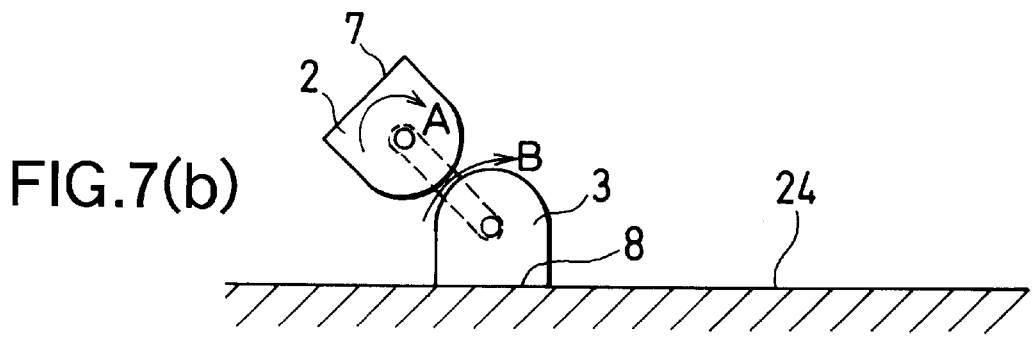
Figure 7C:
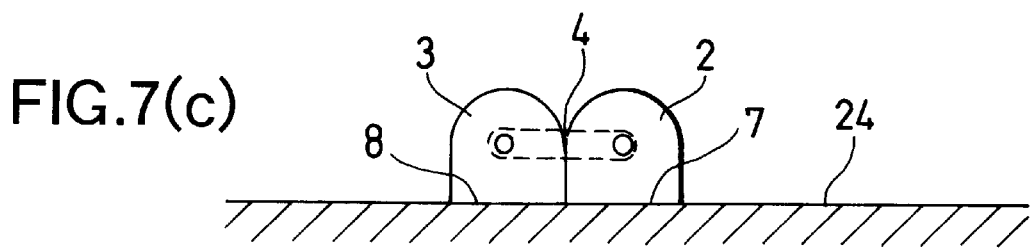
Figure 7D:
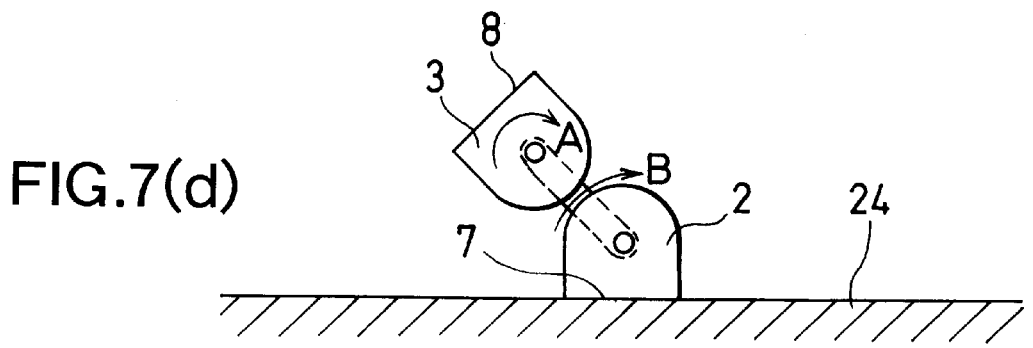

At the time of the assembly of the coupling/uncoupling device 30 provided with the aforementioned members, starting from the assembled state of the body members 54 shown in FIGS. 6(g) and (h), the attractive member 53 consisting of the base plate 35, interposition members 36 and permanent magnets 37 taken as a unit is placed upon the lower frame 58. At this time, the central support 63 passes through the central hole 73 in the base plate 35 and the rods 64 pass through the four peripheral holes 67 in the periphery. The conical coil springs 40 and shape memory alloy spring 41 are placed upon the base plate 35 thus set, in the layout shown in FIG. 6(c). The side surface part 10 or end face part 7 is further placed thereupon. At this time, the rods 64 protruding from the lower frame 58 pass through rod penetration holes 70 formed in the side surface part 10 or end face part 7. In addition, outside holes 71 in the side surface part 10 or end face part 7 face screw holes 72 formed in the peripheral supports 61 secured to the lower frame 58, while the central hole 73 faces a screw hole 74 in the central support 63. At this time, four holes 15 in the side surface part 10 or end face part 7 face the permanent magnets 37 so the permanent magnets 37 can extend from the holes 15. Thereafter, four screws 75 are screwed from the outside holes 71 of the side surface part 10 or end face part 7 into the screw holes 72, and one screw 76 is screwed from the central hole 77 into the screw hole 74, thus assembling the unit.

On the other hand, the second member 33 has a constitution as shown in FIG. 4 wherein the second permanent magnets 42 are fitted and secured in hollows 39 formed on the bottom surface of the base plate 38.

Figure 1:
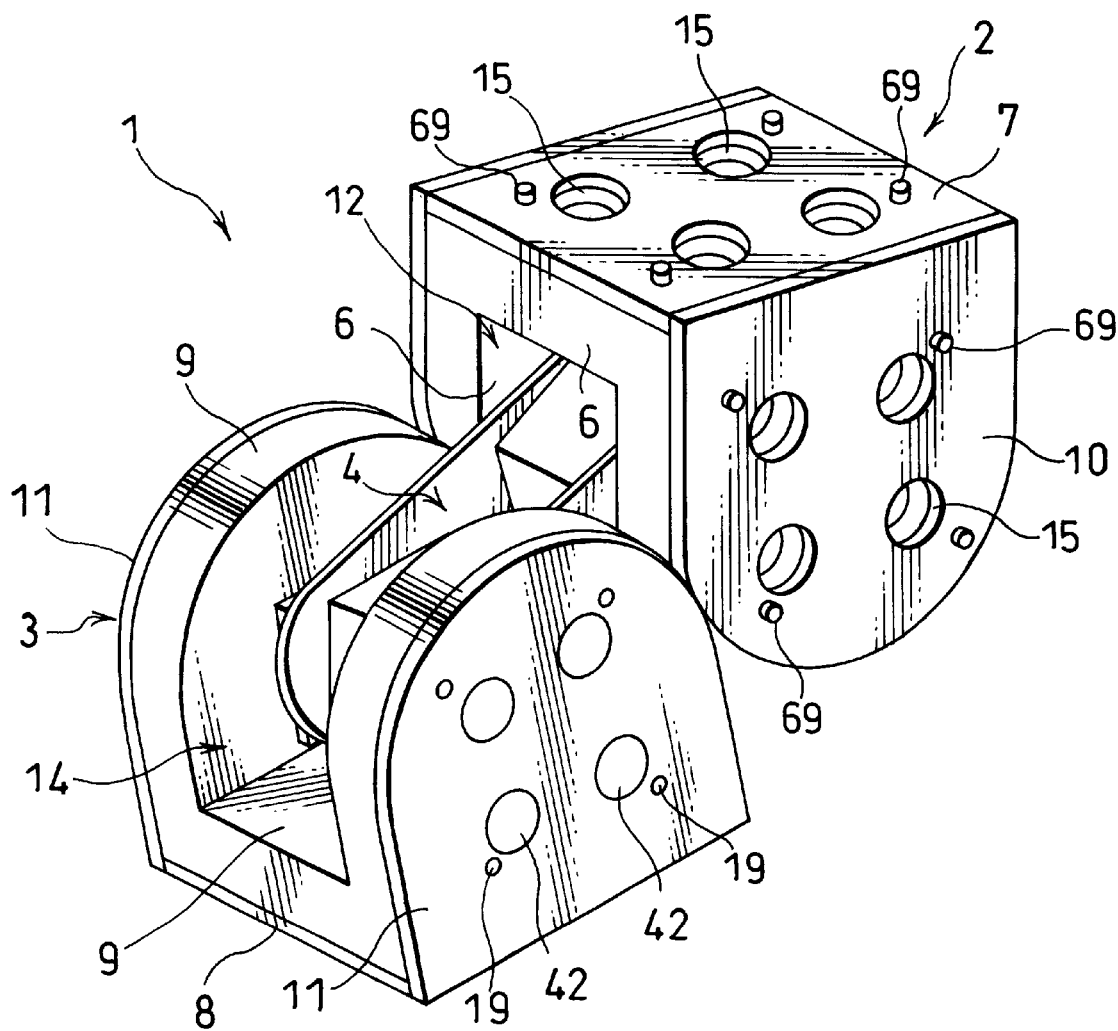
FIG. 1 is a perspective diagram of the universal unit that forms three-dimensional structures according to the present invention.

The three-dimensional universal unit for movable structures according to the present invention uses the aforementioned universal unit coupling/uncoupling device 30, and the overall constitution may consist, as shown in FIG. 1 for example, of a first coupling member 2 and a second coupling member 3 of the same shape which are rotatably linked by a link-drive member 4 to form a three-dimensional universal unit 1. The first coupling member 2 comprises the pair of opposing side surface parts 10 placed at a predetermined interval and the end face part 7 connected to form a right angle with one end face of each side surface part 10. A cover 6 is fitted in a space defined by the side surface parts 10 and end face part 7 to form accommodation spaces. The coupling/uncoupling device 30 that has the basic structure shown in FIG. 6 and operates in accordance with the principle shown in FIG. 3 is built in each of the accommodation spaces. Each of the side surface parts 10 and end face part 7 is formed with holes 15 at positions corresponding to the positions of the first permanent magnets 37 shown in FIG. 6 and slightly protruding male electrodes 69 outside the holes 15.

The second coupling member 3 similarly comprises the pair of opposing side surface parts 11 placed at a predetermined interval and the end face part 8 connected to form a right angle with one end face of each side surface part 11. A cover 9 is fitted in a space defined by the side surface parts 11 and end face part 8 to form accommodation spaces. The second member 33 of FIG. 4 that comprises the base plate 38 and the second permanent magnets 42 is accommodated in each of the accommodation spaces so that the second permanent magnets 42 are exposed outside of each of the side surface parts 11 and end face part 8. Each of the side surface parts 11 and end face part 8 is formed with female electrodes 19 outside of the exposed second permanent magnets 42 at positions corresponding to the positions of the male electrodes 69 of the first coupling member 2. One end of the link-drive member 4 is fitted in a linkage hollow 12 defined by the cover 6, and the other end thereof in a linkage hollow 14 defined by the cover 9, thereby connecting and supporting the first and second coupling members 2 and 3.

Figure 2A:
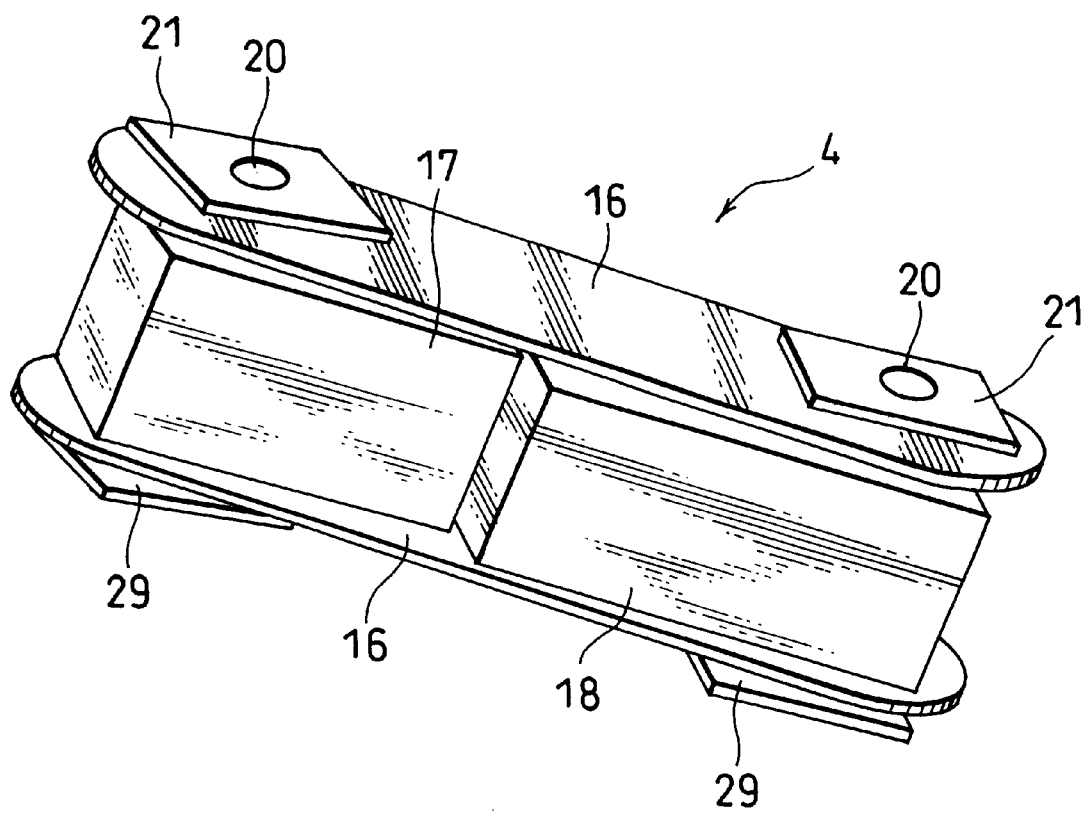
FIG. 2(a) is a perspective diagram showing the link-drive member of the universal unit of FIG. 1.
Figure 2B:
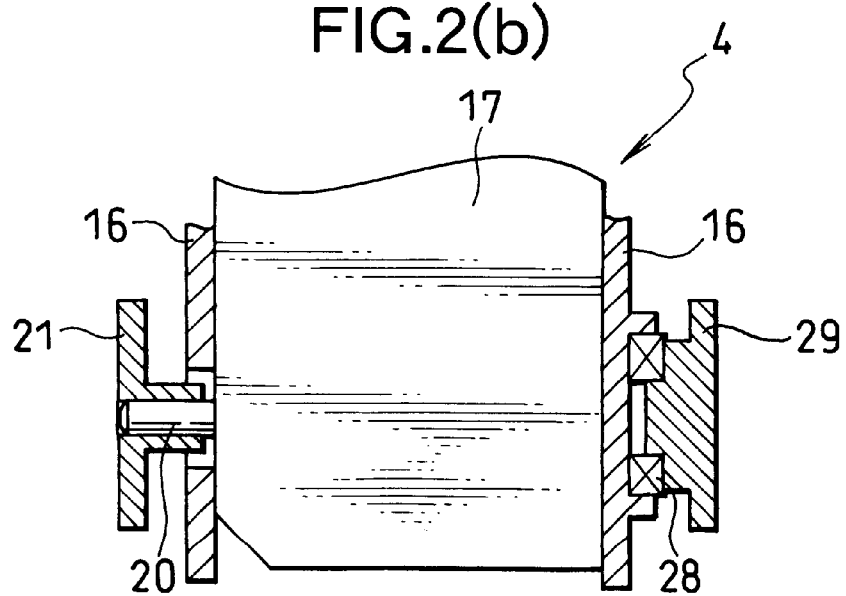
FIG. 2(b) is a cross section of the link-drive member of FIG. 2(a).

As shown in FIG. 2(*a*), the link-drive member 4 that links the first and second coupling members 2 and 3 consists of link plates 16 on either side, between which are provided a first motor 17 and a second motor 18, and as shown in FIG. 2(*b*), a link shaft 20 of the first motor 17 extends from the side plates 16 on the left side in the figure and is secured to a drive plate 21. In addition, a free-rotation plate 29 is rotatably supported by a bearing 28 along the same axis as the link shaft 20 on the outside of the side plate 16 on the right side in the figure. In addition, the second motor 18 has the same constitution. Thus, the first coupling member 2 rotates when the first motor 17 is driven, and the second coupling member 3 rotates when the second motor 18 is driven.

A three-dimensional universal unit 1 having the aforementioned constitution is able to move in a straight line as shown in FIG. 7. To wit, starting from the state shown in FIG. 7(*a*), wherein both the end face parts 7 and 8 of the first and second coupling members 2 and 3 are in contact with a floor surface 24 consisting of end face parts 7 and 8 of a large number of units, when the motor of the first coupling member 2 rotates in the direction of arrow A in FIG. 7(*b*) and at the same time the motor of the second coupling member 3 rotates in the direction of arrow B in the figure, the link-drive member 4 rotates with the rotation of the motor of the second coupling member 3. The first coupling member 2 can be raised and rotated by 180° and can thus be moved to the position shown in FIG. 7(*c*). Since the first coupling member 2 is also rotated by 180° in the direction of arrow A at the same time, the first coupling member 2 is ultimately positioned as shown in FIG. 7(*c*), so the universal unit 1 is moved by the length of the distance between the shafts of the link-drive member 4 in a straight-line direction from the position shown in FIG. 7(*a*). Note that when the motors of the first and second coupling members 2 and 3 rotate in the direction opposite the direction of arrows A and B in the figure, the second coupling member 3 can be raised and rotated by 180° in the direction opposite to the direction of arrow B in the figure and can thus be moved to the position adjacent to the first coupling member 2 at the left side in the figure.

Thereafter, in the same manner as in FIG. 7(*b*), the first coupling member 2 can rotate the link-drive member 4 in the same direction and the second coupling member 3 rotates so it can be driven and moved as shown in FIG. 7(*d*). In the aforementioned operation, if the floor surface 24 is also covered with units equipped with the same mechanisms as the mechanisms of each coupling member, then the aforementioned operation can be performed more easily.

In addition, when the first coupling member 2 must be separated from the floor surface 24 as shown in FIG. 7(*b*), by electrifying and heating the shape memory alloy spring 41 as shown in FIG. 3(*c*), the second permanent magnets 42 can be separated from the floor surface 24, and thus the first coupling member 2 can be moved freely, so when the second coupling member 3 rotates the link-drive member 4, the first coupling member 2 can be easily lifted from the floor surface 24.

Figure 8A:
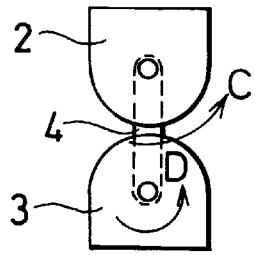
FIGS. 8(a), 8(b) and 8(c) are top views showing the universal unit according to the present invention in translational movement upon a flat surface.
Figure 8B:
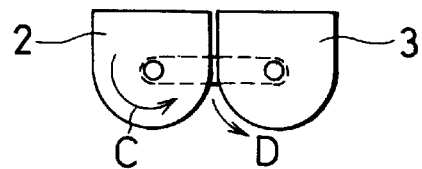
Figure 8C:
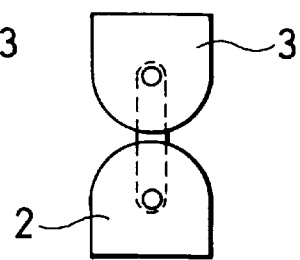
Figure 9A:
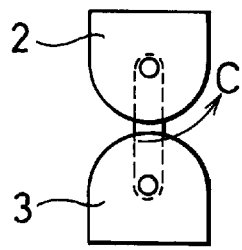
FIGS. 9(a), 9(b) and 9(c) are top views showing the universal unit according to the present invention in rotational movement upon a flat surface.
Figure 9B:
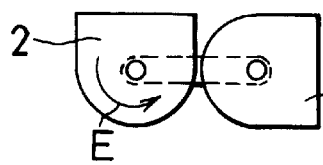
Figure 9C:
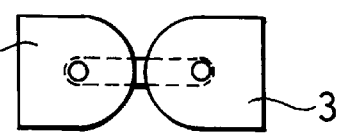
Figure 10A:
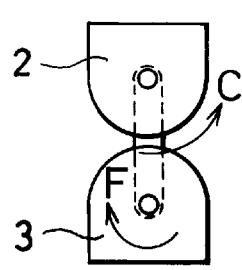
FIGS. 10(a), 10(b) and 10(c) are top views showing the universal unit according to the present invention in pivoting movement upon a flat surface.
Figure 10B:
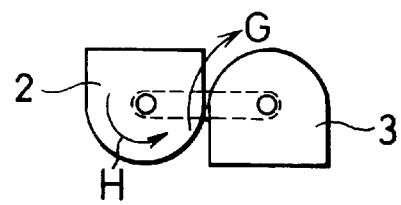
Figure 10C:
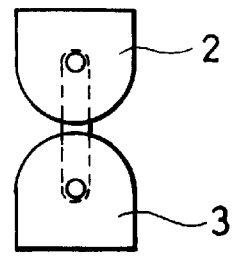
Figure 11A:
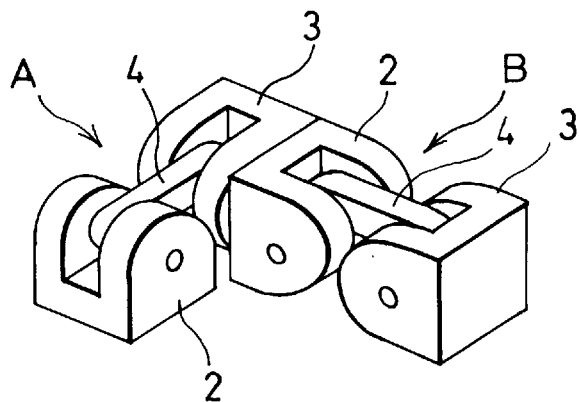
FIGS. 11(a), 11(b), 11(c) and 11(d) are perspective diagrams showing an example of using two universal units according to the present invention to perform a mode change.
Figure 11B:
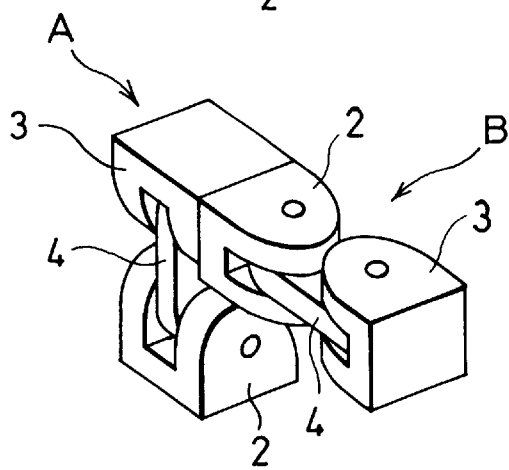
Figure 11C:
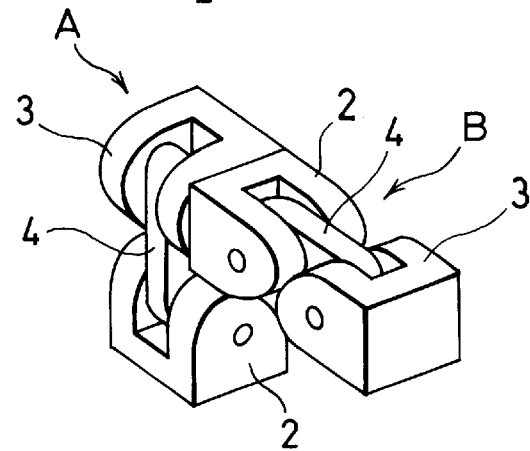
Figure 11D:
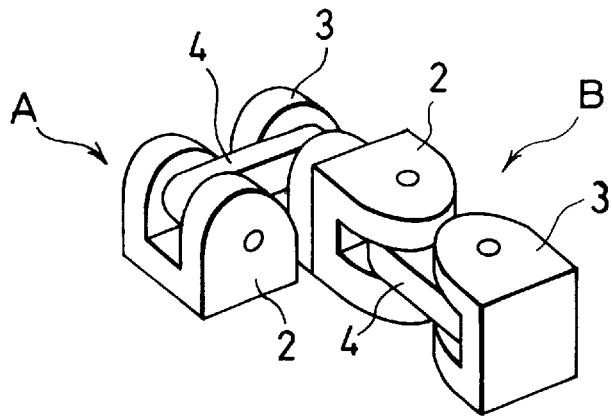

The three-dimensional universal unit 1 of the present invention can move in various modes of movement upon a flat surface consisting of units as shown in FIGS. 8–10. To wit, starting from the state of being placed upon a floor surface as shown in the top view in FIG. 8(*a*), the coupling/uncoupling device provided on the side surface part of the first coupling member 2 can remain attached to the floor surface while the second coupling member 3 side is put in the free state, and then the first motor of the first coupling member 2 can be rotated 90° in the direction C in the figure and at the same time the second motor of the second coupling member 3 can be rotated 90° in the direction D in the figure, resulting in the state shown in FIG. 8(*b*). Thereby, it is moved from the state shown in FIG. 8(*a*) by the length of half the distance between the shafts of the link-drive member 4 to the state shown in FIG. 8(*b*). In the same manner, the coupling/uncoupling device provided on the side surface part of the floor surface side of the second coupling member 3 can be attached to the floor surface while the first coupling member 2 is put in the free state, and then the second motor of the second coupling member 3 can be rotated 90° in the direction D and at the same time the first motor of the first coupling member 2 can be rotated 90° in the direction C, resulting in the state shown in FIG. 8(*c*). As a result, it has moved translationally from the state shown in FIG. 8(*a*) by the length of the distance between the shafts of the link-drive member 4 and also the positions of the first coupling member 2 and second coupling member 3 are reversed.

In addition, starting from the state shown in FIG. 9(*a*) which is the same as in FIG. 8(*a*), by a technique similar to that described above, if only the first motor of the first coupling member 2 is rotated by 90° in the direction of arrow C in the figure then this results in the state shown in FIG. 9(*b*). From here, if the second coupling member 3 is put in the fixed state and the first coupling member 2 is put in the free state, then rotating the first coupling member 2 by 90° in the direction of arrow E results in the state shown in FIG. 9(*c*). This state is the position shown in FIG. 9(*a*) rotated by 90° about the axis of rotation of the first coupling member 2 to the new position.

Moreover, starting from the state shown in FIG. 10(*a*) which is the same as in FIG. 8(*a*), by a technique similar to that described above, if the first motor of the first coupling member 2 is rotated by 90° in the direction of arrow C and at the same time the second coupling member 3 is rotated by 90° in the direction of arrow F, then this results in the state shown in FIG. 10(*b*). From here, if the second coupling member 3 is put in the fixed state, the second motor is rotated by 90° in the direction of arrow G, and the first coupling member 2 is put in the free state, then rotating the first motor by 90° in the direction of arrow H results in the state shown in FIG. 10(*c*). This state is the same as pivot-type movement from the position shown in FIG. 10(*a*).

While a single universal unit can also perform various motions as shown above, if two of these are combined, then operations such as those as shown in FIG. 11, for example, can be performed. To wit, using a first universal unit A and a second universal unit B that are coupled together as shown in FIG. 11(*a*), if the end face part of the first coupling member 2 of the first universal unit A is secured to the floor surface, when the first motor is driven to rotate the link-drive member 4 by 90° as shown in FIG. 11(*b*), the second universal unit B will be raised up while remaining attached to the second member 3 of the first universal unit A. If the second motor is rotated by 90° in this state, the second universal unit B will also rotate by 90°, resulting in the state shown in FIG. 11(c). From here, rotating the first motor by 90° in the opposite direction results in the position shown in FIG. 11(d), and this state is the same as the state shown in FIG. 11(a) but with the second universal unit B at a position rotated by 90° in its lengthwise direction. Thereby, it is possible to change the mode from one wherein the second universal unit B rotates in the direction perpendicular to the floor surface as shown in FIG. 11(a), to one wherein it rotates in the direction parallel to the floor surface as shown in FIG. 11(c). Note that at the time of coupling a plurality of universal units as described above, it is possible to exchange control signals and exchange power, so mutually related operations can be performed.

Figure 12:
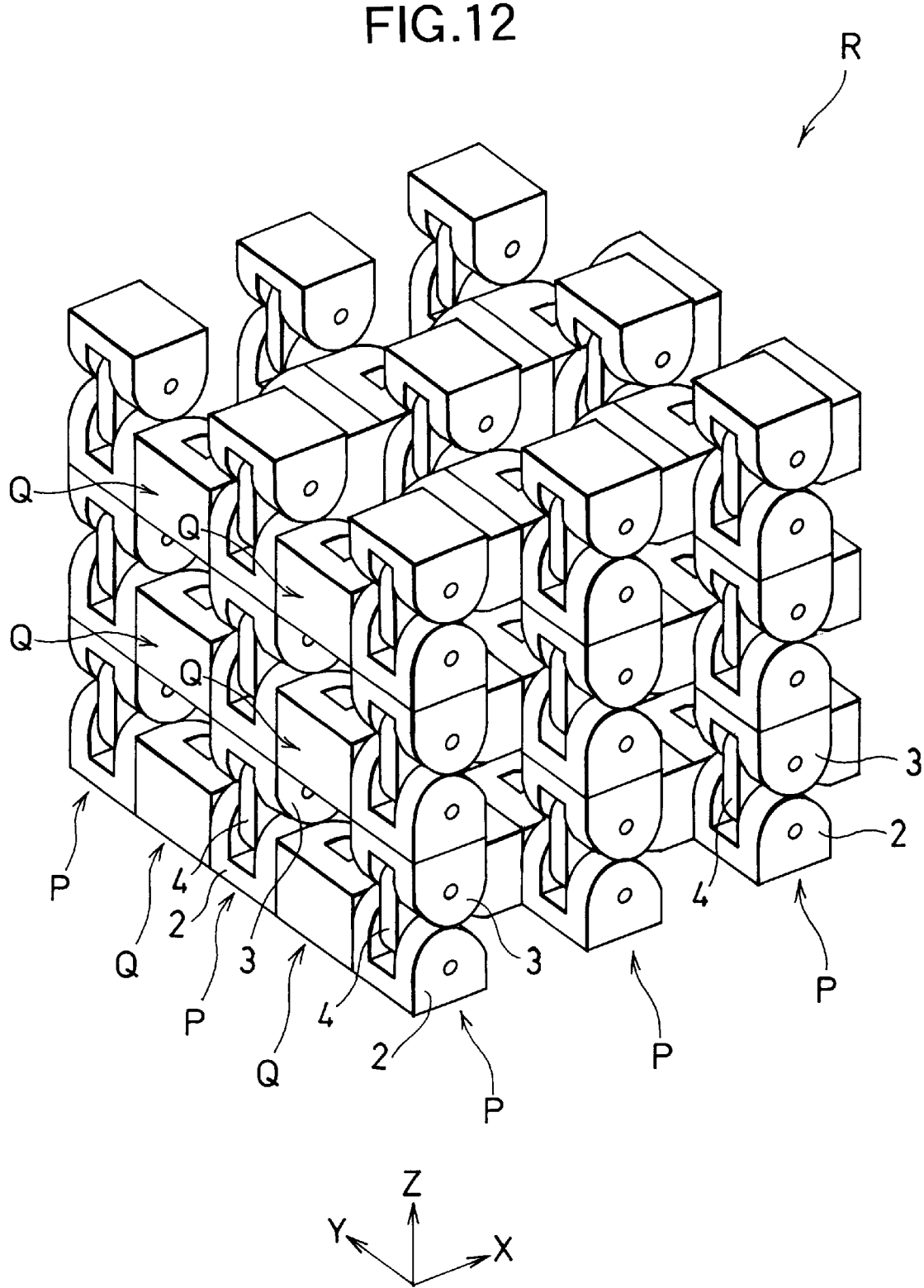
FIG. 12 is a perspective diagram showing an example of forming a structure using a plurality of universal units according to the present invention.

By using a plurality of universal units, it is possible to form various structures such as the one shown in FIG. 12, for example. To wit, in FIG. 12, three columnar members P formed by attaching the end faces to each other above and below are arranged in a matrix in the X-axis direction and similarly three columnar members P are arranged in the Y-axis direction. Between the columnar members P in the Y-axis direction are arranged beam-shaped members Q that have the same constitution as the columnar members P and extend in the X-axis direction, and the portions facing the columnar members on both sides are attached to each other in a fixed state. Thereby, the block R constituting the entire unit can be given a rigid structure. Note that starting from the state of such a structure, by appropriately separating the mutually attached and fixed portions and driving the appropriate motors, it can be changed to various forms.

Figure 13:
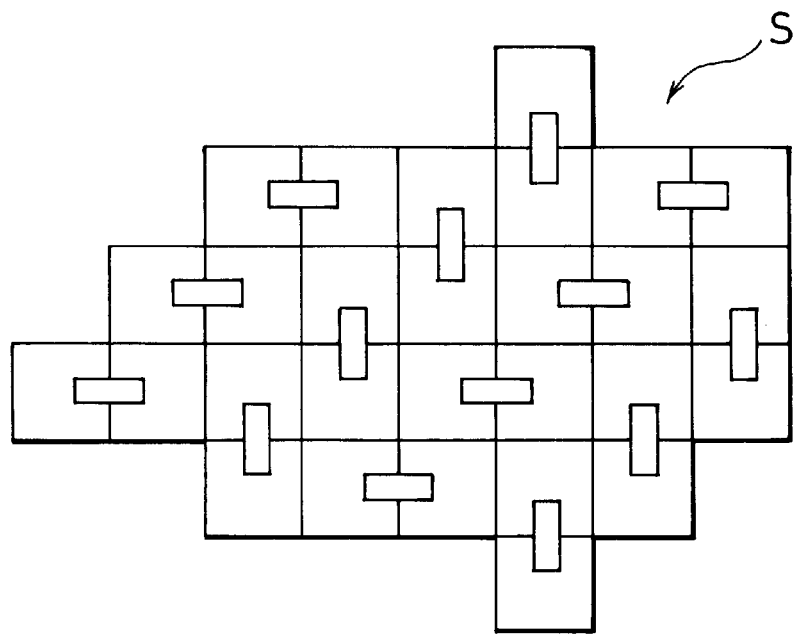
FIG. 13 is a top diagram showing an example of forming a planar member using a plurality of universal units according to the present invention.
Figure 14:
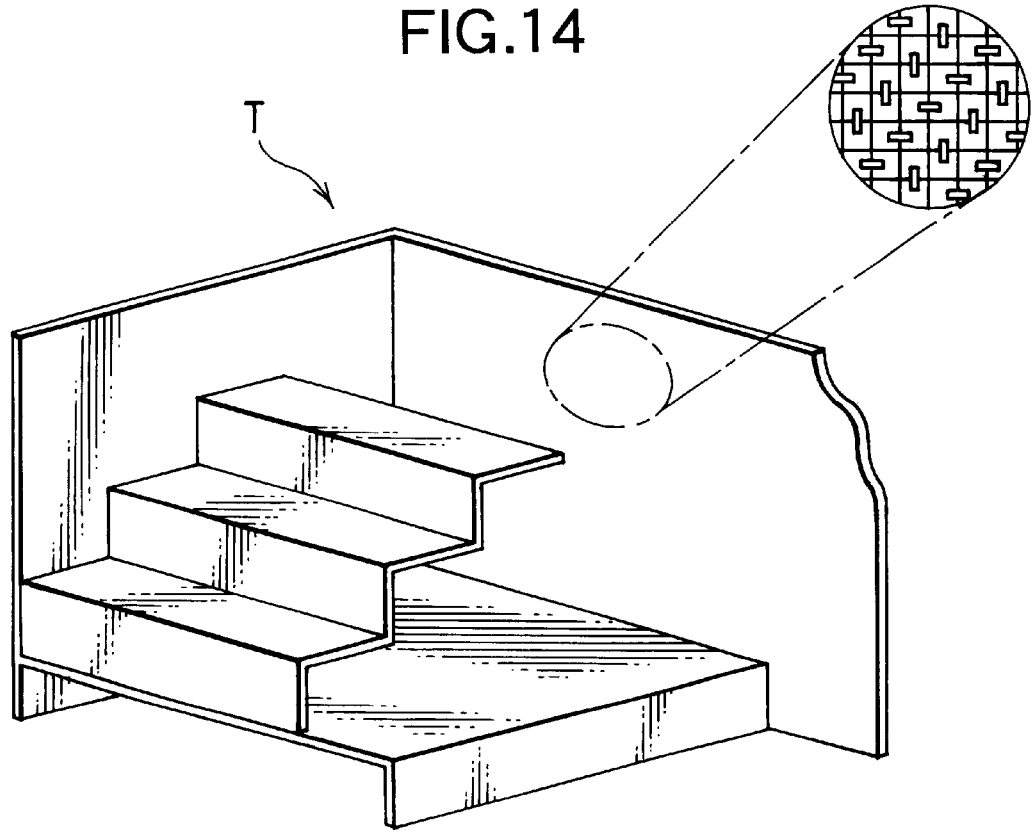
FIG. 14 is a perspective diagram showing an example of forming various structures using a plurality of universal units according to the present invention.

Moreover, by combining a plurality of universal units, it is possible to construct a planar member S with an arbitrary shape as shown in FIG. 13. By using such a planar member S, it is possible to form a structure T of various forms including a step-like form such as that shown in FIG. 14. At this time, by culling couplings within the plane and using them appropriately as coupling areas among both planes, the planar member S can be formed as not only one layer but also as two layers, and moreover, by arranging structures such as those shown in FIG. 12 widely upon the plane, planar members can be formed and these can be used to construct a structure T such as that shown in FIG. 14. In such a structure T also, by appropriately separating the mutually attached and fixed portions of the various universal units and driving the appropriate motors, it can be changed to various forms.

In addition, it is possible to form a structure such as that shown in the schematic diagram in FIG. 15 showing a working example of the present invention, by extending four lateral legs B from a central trunk A, arranging attachment areas C at the tips of each leg so that they can grip the floor surface below, providing a head D at the tip of the trunk A, and providing a tail E at the rear to form a scorpion-shaped quadruped mobile structure F. In addition, a large number of legs can be provided to give a millipede or centipede shape. While the explanation will be omitted here, a universal unit having this structure can also be formed by taking a board-shaped set disposed in a plane, for example, and sequentially combining the various universal unit motions shown in the FIGS. 7–11. In addition, it is possible to form combinations having various structures and forms.

The aforementioned working examples are no more than a few examples of the possible combinations of universal units, so as shown in FIG. 16, it is possible to form a three-dimensional universal unit for movable structures that is able to move freely nearly anywhere while freely changing shape. By providing electrical power connections and connections for control signals among the various universal units, and also providing each universal unit with an on-board microprocessor, it is possible for a plurality of coupled universal units to perform operations as if it were a single life form. In addition, the attachment areas used in the universal units can be an electromagnetic mechanism as shown in the aforementioned working examples, or various other coupling mechanisms such as a hooking mechanism wherein an L-shaped hook is used to hook onto the other side. In addition, while the aforementioned working examples included examples wherein the drive mechanism is provided in the link-drive member, it is also possible to provide such within the various coupling members, for example, and thus the link between the two coupling members is a simple plate-like structure.

The present invention provides a three-dimensional universal unit for movable structures that can easily construct machines that have active components and that has a simple structure, can operate reliably even after long-term use and that can be manufactured inexpensively.

What is claimed is:

1. A three-dimensional universal unit for movable structures comprising:

first and second coupling members, each of which comprises two opposing side surface parts, an end face part connected to form a right angle with one end face of each side surface part, a coupling/uncoupling device provided on the two side surface parts and end surface part of the first coupling member, the coupling/uncoupling device including a shape memory alloy spring for coupling and uncoupling the first and second coupling members, a permanent magnet provided on the two side surface parts and end face part of the second coupling member, and a linking part disposed between the two side surface parts of each coupling member;

a linking member that rotatably links the linking parts of the two coupling members; and a drive apparatus that rotationally drives the coupling members relative to the linking member.

2. The three-dimensional universal unit for movable structures according to claim 1, wherein said coupling/uncoupling device comprises:

a top plate, a base plate disposed movably opposite to said top plate, a permanent magnet secured upon said base plate, and a compression coil spring disposed between said base plate and said top plate to continuously push the two apart, wherein the shape memory spring is disposed between said base plate and said top plate, said shape memory spring taking two positions: a first shape that does not contact one of the base plate and top plate when the base plate is separated furthest from the top plate to couple the first and second coupling members; and a second shape that pushes in a direction separating the base plate and top plate when the base plate is closest to the top plate to uncouple the first and second members.

3. The three-dimensional universal unit for movable structures according to claim 2, wherein said compression coil spring is a conical coil spring adapted to attraction characteristics of said permanent magnet.

4. The three-dimensional universal unit for movable structures according to claim 1, wherein the drive apparatus is provided on a side of said linking member.

5. The three-dimensional universal unit for movable structures according to claim 1, wherein one of said coupling members is provided at the side surface parts and end face part thereof with male electrodes and the other coupling member is provided at positions thereof corresponding to positions of the male electrodes with female electrodes.

* * * * *